(12) United States Patent
Perez-Sanchez (10) Patent No.: US 7,510,151 B2
(45) Date of Patent: Mar. 31, 2009

(54) WING WITH EXTENDABLE AERODYNAMIC PIVOTED FLAPS

(75) Inventor: Juan Perez-Sanchez, Feldkirchen-Westerham (DE)

(73) Assignee: EADS Deutschland GmbH, Ottobrunn (DE)

(*) Notice: Subject to any disclaimer, the term of this patent is extended or adjusted under 35 U.S.C. 154(b) by 403 days.

(21) Appl. No.: 11/400,518

(22) Filed: Apr. 10, 2006

(65) Prior Publication Data

US 2006/0226297 A1  Oct. 12, 2006

(30) Foreign Application Priority Data

Apr. 11, 2005  (DE) ........................ 10 2005 016 639

(51) Int. Cl.
*B64C 9/00* (2006.01)
(52) U.S. Cl. ...................................... 244/213; 244/216
(58) Field of Classification Search ................ 244/198, 244/201, 213–217
See application file for complete search history.

(56) References Cited

U.S. PATENT DOCUMENTS 4,381,093 A * 4/1983 Rudolph ................ 244/216
4,444,368 A * 4/1984 Andrews ................ 244/216
2005/0040294 A1  2/2005 Perez-Sanchez et al.

FOREIGN PATENT DOCUMENTS

| DE | 10133920 A1 | 1/2003 |
|---|---|---|
| DE | 10133920 B4 | 5/2004 |

* cited by examiner

*Primary Examiner*—Michael R Mansen
*Assistant Examiner*—Michael Kreiner
(74) *Attorney, Agent, or Firm*—Greenblum & Bernstein, P.L.C.

(57) ABSTRACT

A structure with at least one flap connected to a wing, including: at least one drive device; at least one actuating device including a gear device coupled to the at least one drive device and the at least one flap; and a fairing housing swivellably mounted on the wing, at least partially surrounding the gear device, and coupled to the gear device, wherein actuation of the at least one drive device causes a combined translational and rotational movement of the at least one flap and a swivelling movement of at least a portion of the fairing housing. A method for pivoting a flap is also disclosed. The instant abstract is neither intended to define the invention disclosed in this specification nor intended to limit the scope of the invention in any way.

15 Claims, 5 Drawing Sheets

WING WITH EXTENDABLE AERODYNAMIC PIVOTED FLAPS

CROSS-REFERENCE TO RELATED APPLICATIONS

The present application claims priority under 35 U.S.C. § 119 of German Patent Application No. 10 2005 016 639.3 filed Apr. 11, 2005, the disclosure of which is expressly incorporated by reference herein in its entirety.

BACKGROUND OF THE INVENTION

1. Field of the Invention

The present invention relates to a wing with extendable aerodynamic pivoted flaps, in particular lift flaps.

2. Discussion of Background Information

In previous known wings, the lift flaps comprise at least one roller carriage, which is provided with rollers guided by a connecting link in a C-shaped rail provided on the structure of the wing. This connecting link guide predetermines the movement path of the lift flaps. Since all of the aerodynamic forces acting on a lift flap have to be supported on the rail via the rollers, it is necessary to configure the rail so that it is extremely stable, resulting in a high weight. The reason for this lies in the fact that very high loads concentrated across the rollers cause bending stress in a rail flange, so that the rail flange must have a high material thickness to withstand the loads.

The actuating device for the pivoted flaps, including the roller carriage, is encased by a fairing or fairing housing which is swivelled downwards during extension of the pivoted flaps. The fairing housing is open at its side in the region of the roller carriage to allow the rollers to cooperate with the rail secured to the wing. As such, the walls of the fairing housing must be reinforced with special structural elements in the region of the roller carriage, which results in increased weight.

A conventional wing is disclosed in German Patent Application No. DE 101 33 920 A1. In this wing, the lift flaps are actuated by a lever mechanism. A leading region of the pivoted flap, connected to the lever mechanism, is guided on a rail by a roller carriage. A connecting link guide is provided as an alternative to the roller carriage guide. In this wing, a portion of the aerodynamic loads acting on the pivoted flap is conducted via the lever mechanism into the supporting surface structure.

SUMMARY OF THE INVENTION

The present invention provides a system and method for configuring a wing in such a way that a reduction in weight is achieved while improving the aerodynamic properties.

The present invention is directed to extendable aerodynamic pivoted flaps, in particular lift flaps, comprising at least one drive device and at least one actuating device for the pivoted flaps loading the drive device. The actuating device comprises a gear device which is coupled to the drive device and to the pivoted flap in such a way that when the drive device is actuated the pivoted flap performs a combined translatory and rotary movement. The gear device comprises a crank mechanism and is supported on a wing. Further, the gear device is at least partially surrounded by a fairing housing swivellably mounted on the wing. The fairing housing is coupled to the gear device in such a way that an actuation of the drive device causes a swivelling movement of at least a portion of the fairing housing.

In a first aspect of the invention, there is a structure with at least one flap connected to a wing, comprising: at least one drive device; at least one actuating device including a gear device coupled to the at least one drive device and the at least one flap; and a fairing housing swivellably mounted on the wing, at least partially surrounding the gear device, and coupled to the gear device. Actuation of the at least one drive device causes a combined translational and rotational movement of the at least one flap and a swivelling movement of at least a portion of the fairing housing.

The at least one flap comprises at least one extendable aerodynamic pivotable flap. The at least one flap comprises at least one lift flap. The at least one actuating device is arranged to actuate the at least one flap. The at least one actuating device is loaded by the drive device. The gear device comprises a crank mechanism. The gear device is supported by the wing. The fairing housing comprises a plurality of housing parts. The fairing housing comprises at least two housing parts that are swivellably arranged with respect to the wing. The at least two housing parts comprise a first housing part and a second housing part. The first housing part is swivellably mounted to the wing. The first housing part is adjacent to the wing. The second housing part is swivellably mounted to the first housing part. The second housing part faces away from the wing. The first housing part and second housing part are coupled to the gear device.

According to a second aspect of the invention, there is a method of moving a flap connected to a gear device that is at least partially surrounded by a fairing housing, the flap being associated with a wing, comprising: driving a leading portion of the flap; steering the flap with the gear device for translational and rotational movement of the flap; and pivoting at least a portion of the fairing housing with the gear device. The pivoting comprises pivoting a first housing part and a second housing part of the fairing housing. The pivoting comprises swivelling the first housing part relative to the wing, and swivelling the second housing part relative to the first housing part.

In a third aspect of the invention, there is a structure with at least one flap connected to a wing, comprising: at least one drive device; at least one actuating device including a gear device coupled to the at least one drive device and the at least one flap; and a fairing housing at least partially surrounding the gear device and composed of a first fairing housing part swivellably mounted to the wing and coupled to the gear device and a second fairing housing part swivellably mounted to the first fairing housing part and coupled to the gear device. Actuation of the at least one drive device causes a combined translational and rotational movement of the at least one flap and a swivelling movement of at least one of the first fairing housing part and the second fairing housing part. The at least one flap comprises at least one lift flap.

In embodiments, the gear device, which is coupled to the drive device and the pivoted flap, forms a compact and narrow actuating device for the pivoted flaps. This device is coupled to the fairing housing in such a way that actuation of the drive device causes a swivelling movement of at least a portion of the fairing housing.

Implementations of the invention eliminate the need to provide a heavy roller carriage, or heavy rails, or a connecting link guide in the wing. The aerodynamic loads that occur at the pivoted flap are borne by the crank mechanism and supported on the wing via the pivots of the crank mechanism. This force distribution results in reduced weight and reduced wear when compared with roller carriages or connecting link guides. As a result, the crank mechanism may be constructed so as to be significantly narrower than conventional connecting link guides with a roller carriage and rail. Additionally, the end face of the fairing housing influencing the aerodynamic resistance may be configured to be narrower and thus smaller than that in conventional arrangements. The aerodynamic resistance is thus reduced.

Implementations of the invention eliminate the need for the fairing housing to have a lateral opening. In embodiments, the fairing housing is constructed as a substantially closed box without the additional structural elements present in conventional arrangements, resulting in reduced weight of the fairing housing. This box construction of the fairing housing also provides that the primary structural parts of the wing and the actuating device for the pivoted flaps are better protected from the outside environment. This reduces the risk of projectiles penetrating down to the primary structural parts or the actuating device, such as, for example, in military applications.

The invention provides that the carrier of the wing structure supporting the drive device and the actuating device may be configured so as to be shorter than conventional carriers (which have to support the rails of the connecting link guide). As such, the invention provides a reduction in weight in this area.

According to embodiments of the invention, the fairing housing is divided into a plurality of housing portions, wherein at least two housing portions of the fairing housing are constructed so as to be swivellable with respect to the wing. This division of the fairing housing allows the fairing housing to curve in the extended state. As such, the gap between the wing, pivoted flap and fairing housing that is produced on extension of the pivoted flap is minimized. This results in a reduction of the acoustic emission that occurs as air flows around the wing and an improvement of the aerodynamic properties of the wing.

In implementations of the invention, the fairing housing is divided into housing portions in which a first housing portion adjacent to the wing is swivellably mounted on the wing, and a second housing portion facing away from the wing is swivellably mounted on the first housing portion. The first housing portion and the second housing portion are coupled to the gear device.

In embodiments, the crank mechanism is constructed as a four-bar linkage. With a four-bar linkage, a straight-line motion gear is formed which allows for translatory movement and rotary movement of the pivoted flap. In this manner, loads are conducted in a defined manner across the hinge points of the pivoted flap or are supported on the wing structure.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF EMBODIMENTS OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1A:
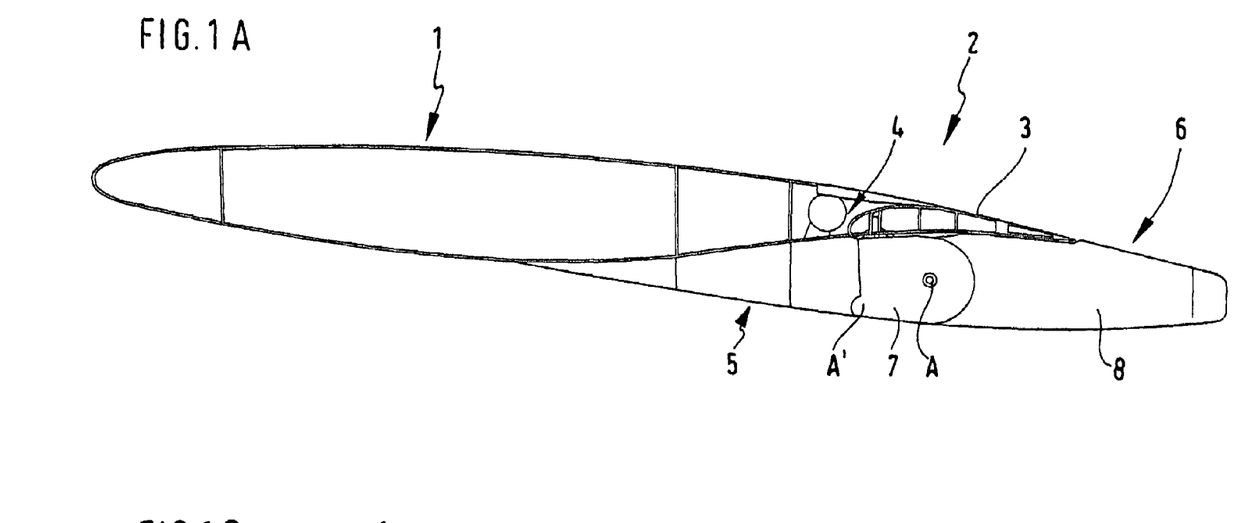
FIGS. 1A-1B show a first embodiment of a wing according to the invention in two positions: in the retracted flap position (FIG. 1A) and in the extended flap position (FIG. 1B)

FIG. 1A shows in cross-section a wing 1 which, at its trailing edge in the direction of flow X (on the right in the figures), is provided with a lift flap arrangement 2. The lift flap arrangement 2 comprises at least one pivoted flap 3, for example a lift flap or landing flap. The flap 3 is mounted by at least one actuating device 4, described in more detail below, on a flap mount 5 (e.g., carrier) connected to the wing 1.

At least one fairing housing 6, within which at least a portion of the actuating device 4 is aerodynamically encased, is provided at the trailing edge of the wing 1 below the pivoted flap 3. In the illustrated example, the fairing housing 6 is divided into a first, leading fairing housing part 7 and a second, trailing fairing housing part 8. The two fairing housing parts 7, 8 are articulated to each other so as to be swivellable about an axis A. In embodiments, the axis A extends transversely to the direction of flow X.

Figure 1B:
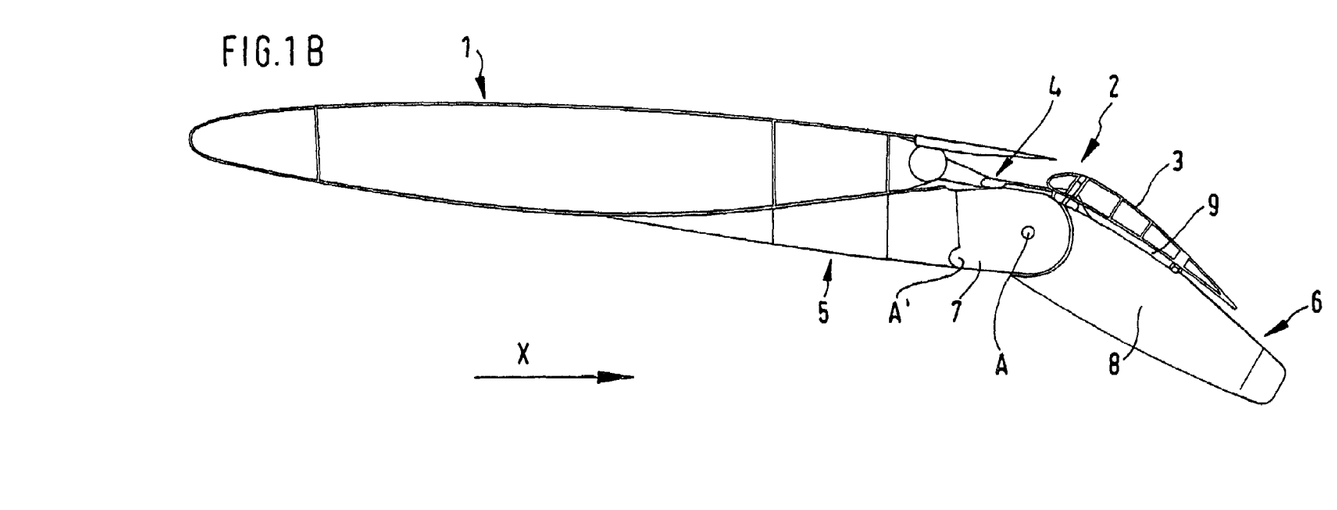

FIG. 1B shows the wing of FIG. 1A with flap 3 extended backwards and swivelled downwards. The flap 3 and the trailing fairing housing part 8 connected to it are swivelled clockwise about the axis A. As depicted in FIG. 1B, the spacing between the trailing fairing housing part 8 and the flap 3 is slight and only a small gap 9 is formed. The two-part configuration of the fairing housing 6 allows the gap 9 to be very narrow so that little air can flow through the gap 9. This reduces both the build-up of noise and the aerodynamic resistances when compared with conventional flap arrangements.

Figure 2A:
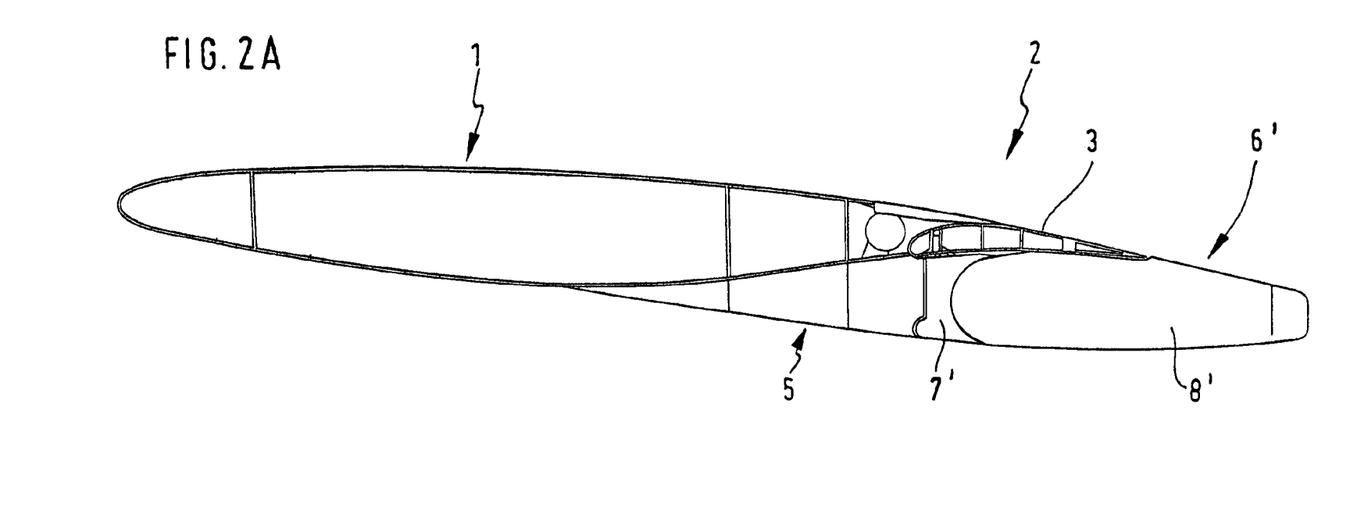
FIGS. 2A-2B show an alternative embodiment of the wing according to the invention in two positions: in the retracted flap position (FIG. 2A) and in the extended flap position (FIG. 2B)
Figure 2B:
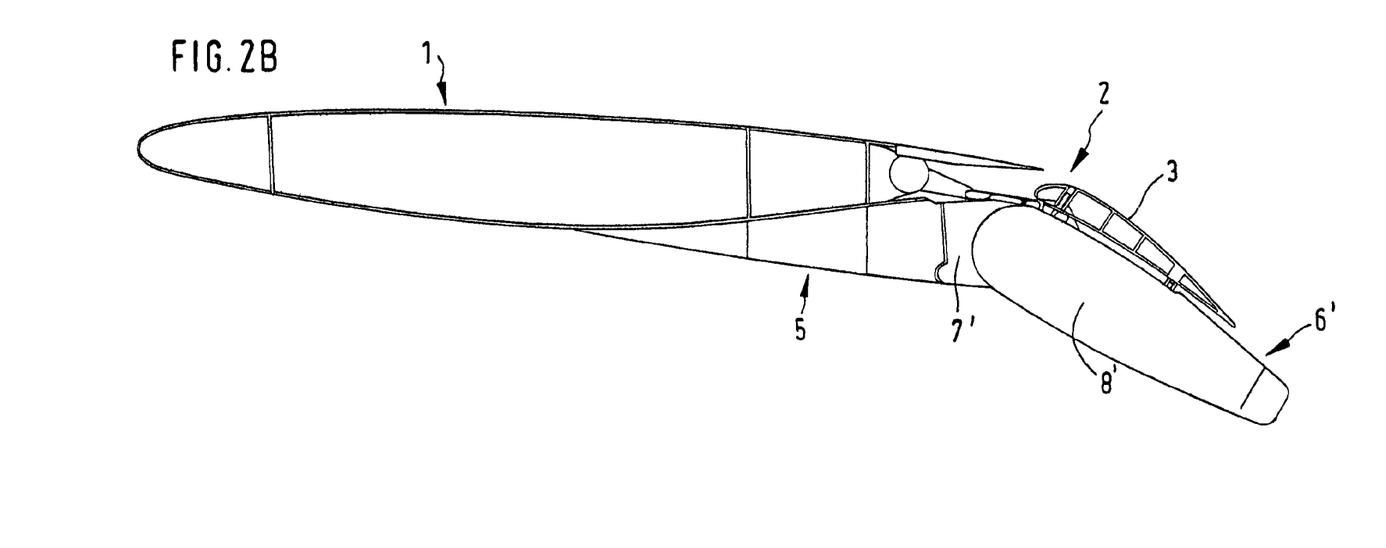

In the embodiment of the wing 1 according to the invention shown in FIGS. 1A and 1B, the trailing end of the leading fairing housing part 7 is convex and the leading end of the trailing fairing housing 8 is concave. Alternatively, as shown in an embodiment in FIGS. 2A and 2B, the leading fairing housing part 7' may be concave in the trailing region while the trailing fairing housing part 8' is convex in the leading region. This fairing housing 6' comprising fairing housing parts 7' and 8' provides the same advantages and benefits as the fairing housing 6 shown in FIGS. 1A and 1B.

Figure 3A:
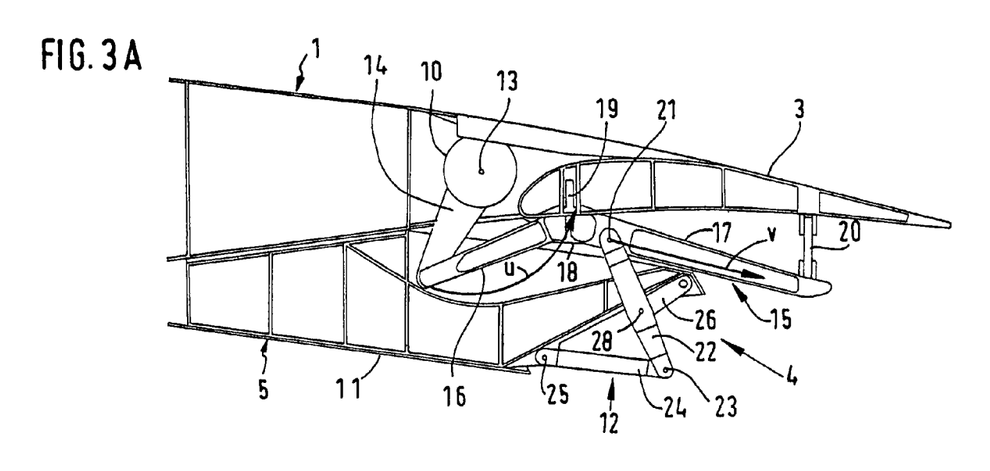
FIGS. 3A-3B show a sectional diagram of the actuating device, without the fairing housing, in two positions: in the retracted flap position (FIG. 3A) and in the extended flap position (FIG. 3B)
Figure 3B:
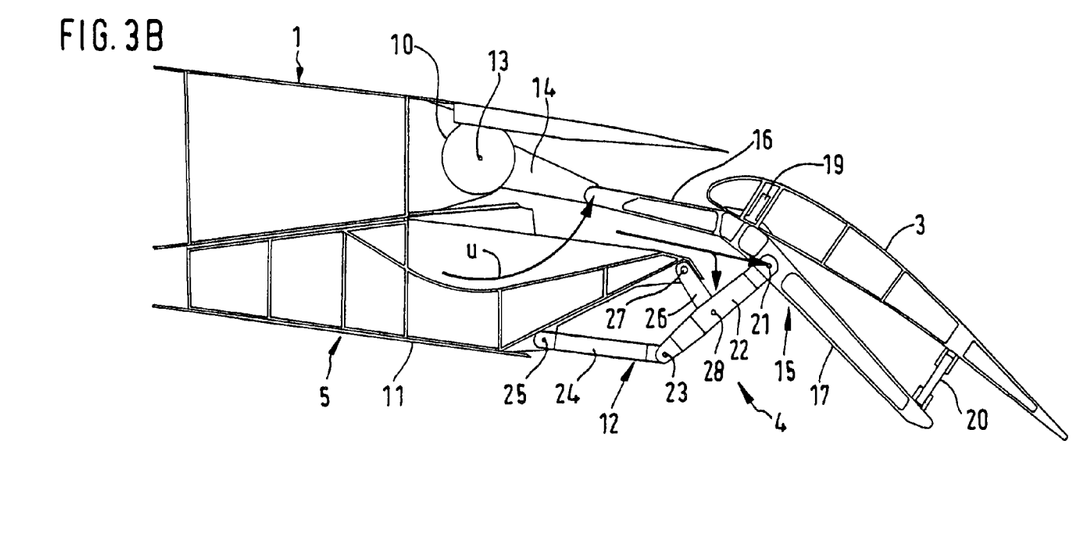

FIGS. 3A and 3B are enlarged views corresponding to FIGS. 1A and FIG. 1B respectively, with the fairing housing 6 not shown. Consequently, the actuating device 4, normally encased by the fairing housing 6, is visible.

The actuating device 4 for the pivoted flap 3 comprises a drive device 10 provided at the trailing edge of the wing 1. The drive device 10 can, for example, include an electric or hydraulic motor. In embodiments, the drive device 10 comprises a shaft driven by an electric or hydraulic motor and extending over at least a portion of the trailing edge of the wing 1. A plurality of drive devices may also be provided for driving the flap 3. For example, two or more actuating devices 4, each encased by a fairing housing 6, are provided for driving the flap 3. However, the invention contemplates that a single actuating device 4 may be used.

The actuating device 4 comprises a gear device 12, constructed as a crank mechanism, in addition to the drive device 10. The gear device 12 comprises a plurality of levers and rods that are articulated to each other, are moveable relative to each other, and connect the drive device 10, the flap 3, the leading fairing housing part 7 and the trailing fairing housing part 8 to each other. A leading portion of the gear device 12 is mounted on a structural element 11 of the flap mount 5, which is provided in the trailing region of the wing 1 and rigidly connected to the wing 1.

In embodiments, the drive device 10 is constructed as a rotary actuator with a drive axis 13 and comprises a drive arm 14 that is movable about the drive axis 13. At its free end, the drive arm 14 is articulated to the leading end of a flap support 15. The flap support 15 is constructed as a one-part carrier bent at an obtuse angle and comprising a leading flap support portion 16 pointing toward the wing 1 and a trailing flap support portion 17 pointing away and downwards from the wing 1. A carrying portion 18 is constructed where the leading flap support portion 16 and the trailing flap support portion 17 meet at an obtuse angle. The carrying portion 18 is connected by a pin fastening 19 to the leading portion of the pivoted flap 3 facing the wing 1, and thus supports the pivoted flap 3 in its leading portion. A supporting strut 20 is provided at the trailing free end of the trailing flap support portion 17. The supporting strut 20 connects the trailing flap support portion 17 of the flap support 15 to the trailing region of the pivoted flap 3, and thus supports the trailing portion of the pivoted flap 3 on the flap support 15.

A steering arm 22 is mounted in articulated fashion on the trailing flap support portion 17 adjacent the carrying portion 18 by a first link 21. In embodiments, the steering arm 22 points away from the flap support 15 and downwards (i.e., facing away from the pivoted flap 3). A first end of a strut 24 is mounted in articulated fashion to the other end of the steering arm 22 by a second link 23. In this manner, the strut 24 acts as a supporting rod and the steering arm 22 acts as an oscillating rod. The other end of the strut 24 is swivellably mounted by a third link 25 on the lower trailing end portion of the structural element 11 of the flap mount 5.

A first end of a pendulum rod 26 is swivellably mounted on the structural element 11 of the flap mount 5 by a fourth link 27. The fourth link 27 is located above the third link 25 and further back with respect to the third link 25. The second end of the pendulum rod 26 is swivellably mounted on the steering arm 22, in a middle portion thereof, by a fifth link 28.

The pendulum rod 26, the portion of the steering arm 22 between the fifth link 28 and the second link 23, the strut 24 and the structural element 11 of the flap mount 5 between the third link 25 and the fourth link 27 form a four-bar linkage. The four-bar linkage has an asymmetric construction with respect to the length of the individual legs of the four-bar linkage between the respectively adjacent links. When the drive device 10 is rotated about the axis 13 in accordance with the arrow "u" (e.g., in the anticlockwise direction), the gear device 12 formed by the four-bar linkage, the flap support 15, and the length of the drive arm 14 are dimensioned in such a way that the first link 21, which swivellably connects the steering arm 22 to the trailing flap support portion 17, performs a substantially linear movement in the direction illustrated by the arrow "v". Thus, in embodiments, a straight-line motion gear is formed. The pivoted flap 3 is thus moved from the retracted state shown in FIG. 3A into the extended position shown in FIG. 3B. The same applies to the swivelling movement of the drive device 10 in the clockwise direction, wherein the first link 21 moves substantially linearly in the opposite direction of arrow"v". The pivoted flap 3 is thus moved from the extended position shown in FIG. 3B to retracted state shown in FIG. 3A.

In the extended state of the pivoted flap 3 (e.g., FIG. 3B), the aerodynamic loads acting on the pivoted flap 3 are conducted via the flap support 15, the steering arm 22, the strut 24, the pendulum rod 26, and the links connecting them into the flap mount 5. In the extended state, only a small portion of the aerodynamic loads acting on the pivoted flap 3 is supported on the wing 1 via the drive arm 14 and the drive device 10.

The aerodynamic loads introduced via the flap 3 are supported on the wing 1 via struts and link joints without the flow of force having to be guided over roller carriage joints or connecting link joints.

Figure 4A:
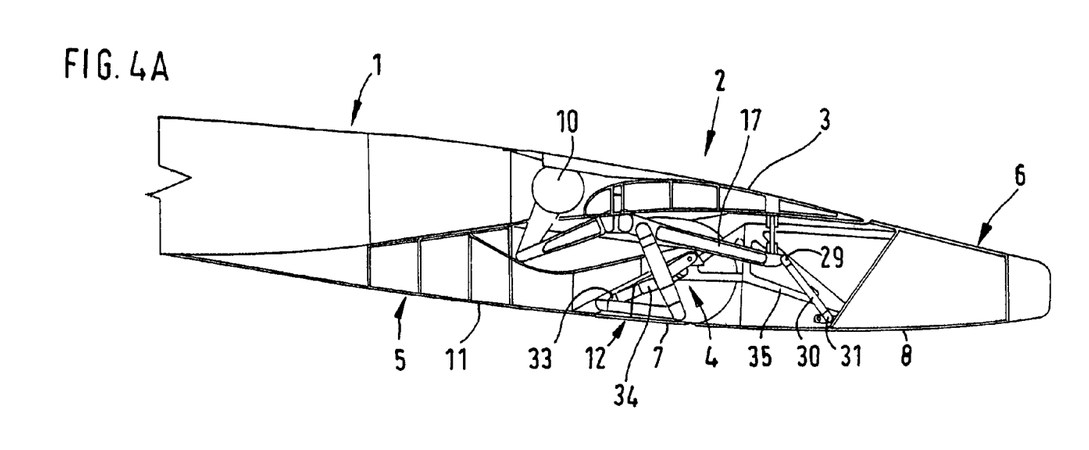
FIGS. 4A-4B show the embodiment of FIG. 1A in a longitudinal section with a view of the actuating device in two positions: in the retracted flap position (FIG. 4A) and in the extended flap position (FIG. 4B)
Figure 4B:
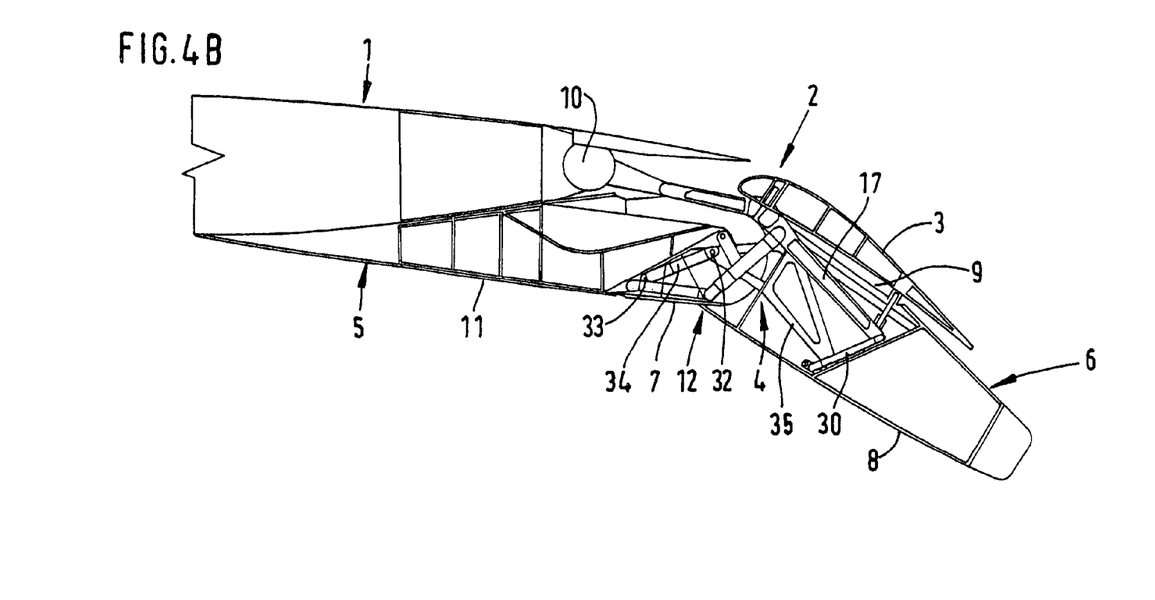

FIGS. 4A and 4B depict the actuating device 4 with the fairing housing parts 7 and 8 illustrated. The trailing fairing housing part 8 is coupled, via a trailing fairing guide rod 30, to the actuating device 4. A first end of the trailing fairing guide rod 30 is swivellably connected to the trailing flap support portion 17 by a link 29 at the trailing free end of the trailing flap support portion 17. An other end of the trailing fairing guide rod 30 is swivellably connected by a link 31 to the structure 35 of the trailing fairing housing part 8. A leading portion of the structure 35 of the trailing fairing housing part 8 engages the leading fairing housing part 7 and is connected thereto by a link 32, so as to be swivellable about the axis A. The leading fairing housing part 7 is mounted, so as to be swivellable about an axis A', by a link 33 at the trailing lower end of the structural element 11 of the flap mount 5. A leading fairing guide rod 34 is mounted by its ends in an articulated manner by the links 32 and 33. The leading fairing guide rod 34 supports the loads acting on the trailing fairing housing part 8 (in particular, the aerodynamic loads) directly on the flap mount 5. In embodiments, the axes A, A', and 13, and the swivelling axes of all the links extend parallel to each other.

FIG. 4B shows how the coupling of the trailing fairing housing part 8 via the gear device 12 to the flap 3 and to the drive device 10 causes the trailing fairing housing part 8 to swivel backwards and downwards when the flap 3 is extended. As a result, the gap 9 between the upper side of the trailing fairing housing part 8 and the lower side of the flap 3 is kept to a minimum.

Figure 5A:
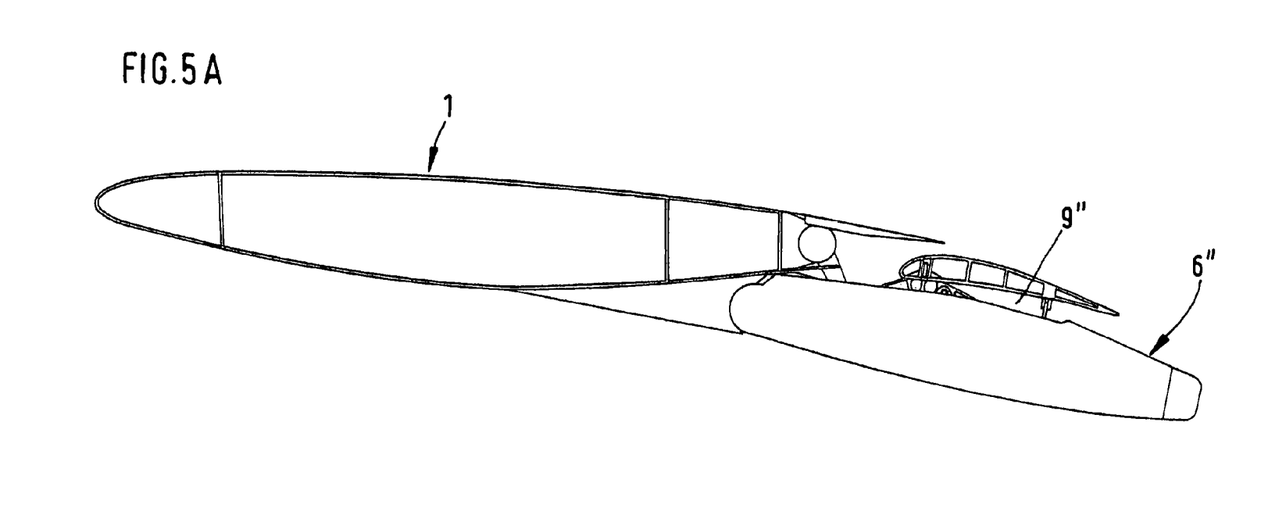
FIGS. 5A-5B show a comparison of a wing according to the invention with a one-part fairing housing (FIG. 5A) and two-part fairing housing (FIG. 5B) with extended pivoted flap.
Figure 5B:
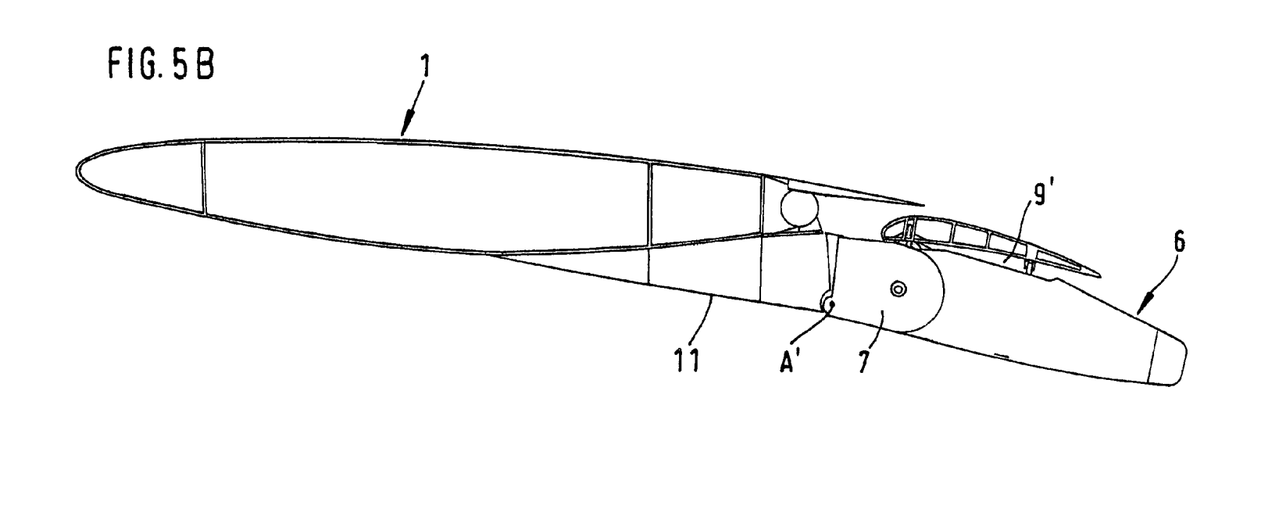

FIGS. 5A and 5B show a comparison of a wing according to the invention with a one-part fairing housing 6" (FIG. 5A) and a wing according to the invention with a two-part fairing housing 6 (FIG. 5B). With the two-part fairing housing 6 in FIG. 5B, the gap 9 between the upper side of the fairing housing 6 and the lower side of the flap 3 produced when the flap 3 is slightly extended is much smaller than the gap 9" in the one-part fairing housing 6" shown in FIG. 5A. The leading fairing housing part 7 of the two-part fairing housing 6 is mounted on the trailing lower end of the flap support 5 so as to be articulated about the axis A'. In embodiments, axis A' extends parallel to axis A. The trailing fairing housing part 8 can be swivelled about the axis A. As such, the two-part fairing housing 6 as a whole may undergo a curvature when both the leading fairing housing part 7 and the trailing fairing housing part 8 swivel. This allows the gap 9' between the fairing two-part fairing housing 6 and the flap 3 to be minimized.

Reference characters in the claims, the description and the drawings are merely used for the purpose of better understanding of the invention and are not intended to limit the scope.

The foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

REFERENCE NUMERALS 1 wing
2 lift flap arrangement
3 pivoted flap
4 actuating device
5 flap mount
6 fairing housing
6' fairing housing
6" fairing housing
7 first, leading fairing housing part
7' first, leading fairing housing part
8 second, trailing fairing housing part
8' second, trailing fairing housing part
9 gap
9' gap
9" gap
10 drive device
11 structural element
12 gear device
13 drive axis
14 drive arm
15 flap support
16 leading flap support portion
17 trailing flap support portion
18 carrying portion
19 pin fastening
21 first link
22 steering arm
23 second link
24 strut
25 third link
26 oscillating rod
27 fourth link
28 fifth link
29 link
30 trailing fairing guide lever
31 link
32 link
33 link
34 leading fairing support strut
35 structure
A axis
A' axis
u arrow
v arrow
X direction of flow

What is claimed:

1. A structure with at least one flap connected to a wing, comprising:
    at least one drive device;
    at least one actuating device including a gear device coupled to the at least one drive device and the at least one flap; and
    a fairing housing swivellably mounted on the wing, at least partially surrounding the gear device, and coupled to the gear device,
    wherein actuation of the at least one drive device causes a combined translational and rotational movement of the at least one flap and a swivelling movement of at least a portion of the fairing housing,
    wherein the fairing housing comprises at least two housing parts that are swivellably arranged with respect to the wing,
    the at least two housing parts comprise a first housing part and a second housing part,
    the first housing part is swivellably mounted to the wing, and
    the second housing part is directly swivellably mounted to the first housing part.

2. The structure of claim 1, wherein the at least one flap comprises at least one extendable aerodynamic pivotable flap.

3. The structure of claim 1, wherein the at least one flap comprises at least one lift flap.

4. The structure of claim 1, wherein the at least one actuating device is arranged to actuate the at least one flap.

5. The structure of claim 1, wherein the at least one actuating device is loaded by the drive device.

6. The structure of claim 1, wherein the gear device comprises a crank mechanism.

7. The structure of claim 1, wherein the gear device is supported by the wing.

8. The structure of claim 1, wherein the fairing housing comprises a plurality of housing parts.

9. The structure of claim 1, wherein the first housing part is adjacent to the wing.

10. The structure of claim 1, wherein the second housing part faces away from the wing.

11. The structure of claim 1, wherein the first housing part and second housing part are coupled to the gear device.

12. A method of moving a flap connected to a gear device that is at least partially surrounded by a fairing housing, the flap being associated with a wing, comprising:
    driving a leading portion of the flap;
    steering the flap with the gear device for translational and rotational movement of the flap; and
    pivoting at least a portion of the fairing housing with the gear devices,
    wherein the pivoting comprises pivoting a first housing part and a second housing part of the fairing housing, and
    the second housing part is directly swivellably mounted to the first housing part.

13. The method of claim 12, wherein the pivoting comprises:
    swivelling the first housing part relative to the wing; and swivelling the second housing part relative to the first housing part.

14. A structure with at least one flap connected to a wing, comprising:
   at least one drive device;
   at least one actuating device including a gear device coupled to the at least one drive device and the at least one flap; and
   a fairing housing at least partially surrounding the gear device and composed of a first fairing housing part swivellably mounted to the wing and coupled to the gear device and a second fairing housing part directly swivellably mounted to the first fairing housing part and coupled to the gear device,
   wherein actuation of the at least one drive device causes a combined translational and rotational movement of the at least one flap and a swivelling movement of at least one of the first fairing housing part and the second fairing housing part.

15. The structure of claim 14, wherein the at least one flap comprises at least one lift flap.

* * * * *